(12) United States Patent
Cornelius et al.

(10) Patent No.: US 8,721,272 B2
(45) Date of Patent: *May 13, 2014

(54) RING DIFFUSER FOR AN AXIAL TURBOMACHINE

(75) Inventors: Christian Cornelius, Sprockhövel (DE); Bernhard Küsters, Jupiter, FL (US); Ulrich Waltke, Mülheim an der Ruhr (DE)

(73) Assignee: Siemens Aktiengesellschaft, München (DE)

( * ) Notice: Subject to any disclaimer, the term of this patent is extended or adjusted under 35 U.S.C. 154(b) by 292 days.

This patent is subject to a terminal disclaimer.

(21) Appl. No.: 13/132,641

(22) PCT Filed: Nov. 19, 2009

(86) PCT No.: PCT/EP2009/065445
§ 371 (c)(1),
(2), (4) Date: Jun. 3, 2011

(87) PCT Pub. No.: WO2010/063583
PCT Pub. Date: Jun. 10, 2010

(65) Prior Publication Data
US 2011/0250055 A1  Oct. 13, 2011

(30) Foreign Application Priority Data
Dec. 5, 2008  (EP) .................................... 08021216

(51) Int. Cl.
*F01D 9/04*  (2006.01)
*F04D 29/54*  (2006.01)

(52) U.S. Cl.
USPC ........ 415/191; 415/193; 415/207; 415/208.2; 415/209.1; 415/211.2; 415/914

(58) Field of Classification Search
USPC ........... 415/207, 211.2, 914, 191, 193, 208.2, 415/209.1, 210.1
See application file for complete search history.

(56) References Cited

U.S. PATENT DOCUMENTS

| | | | | |
|---|---|---|---|---|
| 2,405,723 | A | * | 8/1946 | Way ................................ 60/266 |
| 2,570,155 | A | * | 10/1951 | Redding ........................ 415/207 |
| 2,798,661 | A | * | 7/1957 | Willenbrock, Jr. et al. .......................... 415/209.1 |
| 2,956,400 | A | | 10/1960 | Ferri |
| 4,117,671 | A | | 10/1978 | Neal et al. |
| 4,167,097 | A | * | 9/1979 | Wosika et al. ................ 415/207 |

(Continued)

FOREIGN PATENT DOCUMENTS

| | | |
|---|---|---|
| CN | 1157600 A | 8/1997 |
| CN | 2613604 Y | 4/2004 |
| DE | 102006048933 A1 | 4/2008 |
| EP | 0410924 A2 | 1/1991 |

(Continued)

*Primary Examiner* — Christopher Verdier

(57) ABSTRACT

A ring diffuser for an axial turbomachine is provided. The ring diffuser includes an outer wall and an inner wall coaxial thereto, between which a diffuser channel extends in a ring shape along an axial extension from an inflow-side end diverging to an outflow-side end, wherein the inner wall and the outer wall each include a wall surface bounding the diffuser channel. In order to specify a diffuser channel that is tailored to an inflow that is uneven along the circumference and that facilitates a particularly efficient conversion of kinetic energy into static energy, a rotationally asymmetric wall surface bounding the diffuser channel on the inlet side is provided.

15 Claims, 3 Drawing Sheets

(56) References Cited

U.S. PATENT DOCUMENTS

| | | | | |
|---|---|---|---|---|
| 4,420,288 | A | * | 12/1983 | Bischoff ................ 415/914 |
| 4,903,477 | A | * | 2/1990 | Butt ..................... 60/39.37 |
| 4,971,768 | A | * | 11/1990 | Ealba et al. ............ 422/176 |
| 5,466,123 | A | * | 11/1995 | Rose ................... 415/914 |
| 5,592,820 | A | | 1/1997 | Alary |
| 6,877,953 | B2 | * | 4/2005 | Guemmer .............. 415/914 |
| 2007/0258819 | A1 | | 11/2007 | Allen-Bradley |
| 2008/0232968 | A1 | | 9/2008 | Nguyen |

FOREIGN PATENT DOCUMENTS

| | | |
|---|---|---|
| EP | 1335136 A1 | 8/2003 |
| EP | 1574667 A1 | 9/2005 |
| GB | 2079399 A | 1/1982 |
| GB | 2281356 A | 3/1995 |
| SU | 623998 A1 | 9/1978 |
| SU | 646096 A1 | 2/1979 |
| SU | 823654 A1 | 4/1981 |
| SU | 1401162 A1 | 6/1988 |

* cited by examiner

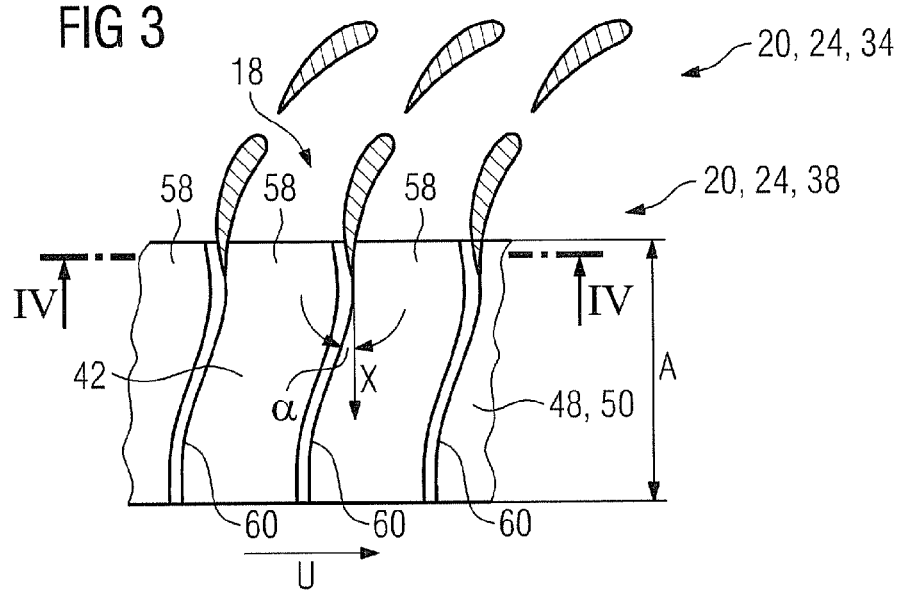
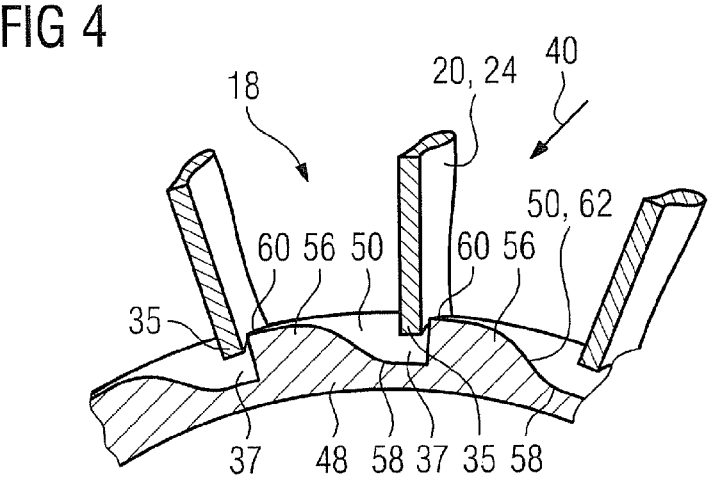

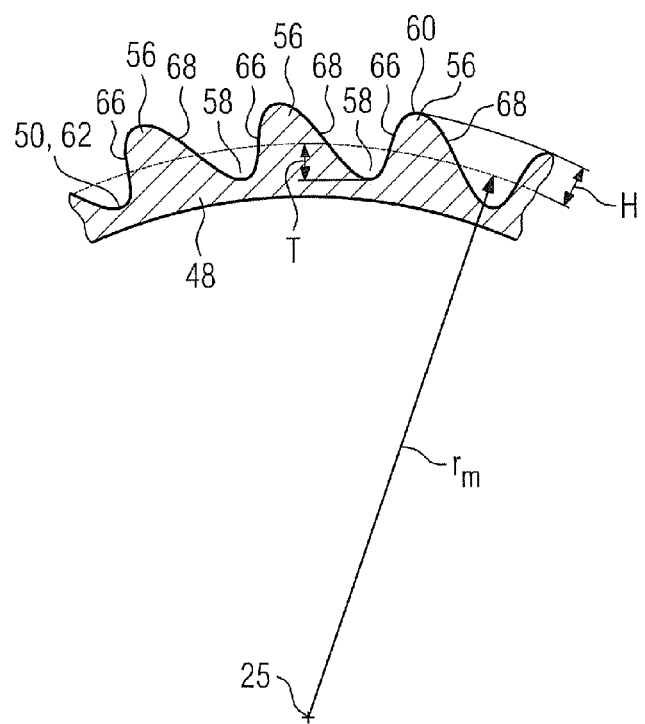

US 8,721,272 B2

RING DIFFUSER FOR AN AXIAL TURBOMACHINE

CROSS REFERENCE TO RELATED APPLICATIONS

This application is the U.S. National Stage of International Application No. PCT/EP2009/065445, filed Nov. 19, 2009 and claims the benefit thereof. The International Application claims the benefits of European Patent Office application No. 08021216.0 EP filed Dec. 5, 2008. All of the applications are incorporated by reference herein in their entirety.

FIELD OF INVENTION

The invention relates to a ring diffuser for an axial turbomachine, with a circular outer wall and with a circular inner wall coaxial thereto, between which a diffuser duct extends in ring form along an axial extent from an inflow-side end to an outflow-side end, the inner wall and the outer wall in each case comprising a wall surface delimiting the diffuser duct. The invention relates, furthermore, to an arrangement for an axial turbomachine, comprising a ring-shaped flow duct which is delimited by wall surfaces of an outer wall and of an inner wall and between which is provided at least one guide vane cascade through which a medium is capable of flowing. The invention also relates, finally, to an axial turbomachine having an abovementioned arrangement.

BACKGROUND OF INVENTION

Ring diffusers are known from the prior art and as indicated in EP 1 574 667 A1, are used, for example, in gas turbines. The gas turbines usually serve for the stationary regeneration of energy or as a drive of aircraft, the ring diffuser initially mentioned often being provided at the outlet of the gas turbine compressor, referred to briefly as a compressor, in order to decelerate the air sucked in and compressed in the compressor and converge its kinetic energy content into static pressure. Normally, in this case, the compressor outlet diffuser is formed by a circular outer wall and a likewise case, the compressor outlet diffuser is formed by a circular outer wall and a likewise circular inner wall arranged coaxially thereto, between which the ring-shaped diffuser duct is provided. The diffuser duct in this case diverges from the inflow-side end to the outflow-side end.

An alternative gas turbine diffuser is known, for example, from U.S. Pat. No. 5,592,820. The diffuser disclosed therein is composed of a multiplicity of tubes of square cross section which are arranged so as to lie in a circle. On the inflow side, the tubes end on an identical radius, whereas, on the outflow side, the tubes end on different radii, thus leading to a distribution of the tube ends which oscillates multiply about a circular line. With the aid of this arrangement, the air provided by the compressor is to be conducted in a comparatively simple way to different components.

In addition, a ring diffuser for a catalytic converter of an automobile is known from EP 0 410 924 A2 which on the outlet side has a casing wavy in the circumferential direction, in order to prevent flow breakaways possibly occurring at this location.

As is known, in gas turbines, the outlet of the compressor, mostly embodied in an axial type of construction, coincides with the inlet of the ring diffuser. A guide vane cascade is provided at the outlet of the compressor or directly upstream thereof. The guide vane cascade is in this case designed either as a guide vane cascade of the last compressor stage and/or as a follow-up guide wheel and, as is known, serves for untwisting the air flowing in the ring-shaped flow duct of the compressor.

Depending on the type of construction, it is known in this case for the guide vanes of the guide vane cascade to be designed so as to be free-standing. The use of free-standing guide vanes in the last compressor stage and in a follow-up guide wheel, present if appropriate, nevertheless leads, particularly in the case of relatively large radial gaps between the free-standing guide vane tips and the inner wall lying opposite them, to a phenomenon where the velocity distribution or total pressure distribution at the outlet of the compressor stage or of the follow-up guide wheel is noticeably uneven along the circumference because of the influence of the eddy flow generated by the gap. Depending on the degree to which the follow-up guide wheel or the guide vanes of the last compressor stage are deflected, the secondary flow which likewise occurs may also possibly give rise on the outer wall to a corresponding unevenness in the outlet velocity. The result of this is that, upon entry into the diffuser, the distribution of the flow magnitudes varies in the circumferential direction and is periodic with the number of follow-up guide wheel passages. This uneven distribution of the kinetic energy causes a correspondingly spatially different capacity of the flow to run counter to the relatively even static pressure gradient in the diffuser.

Instead of free-standing guide vanes, it is also known to use guide vane leaves fastened to platforms on both sides for the vane cascade. In guide vane cascades of this type, there are no radial gaps on the side of the blade leaf tips, so that less significant unequal distributions of flow magnitudes occur here.

SUMMARY OF INVENTION

However, the unequal distributions lead to aerodynamic losses in the diffuser, thus resulting in the object of the invention.

The object of the invention is to provide a ring diffuser for an axial turbomachine having especially low aerodynamic losses. A further object of the invention is to provide an arrangement for an axial turbomachine, comprising a guide vane cascade which precedes the ring diffuser and is likewise designed to have especially low aerodynamic losses. Moreover, a further object of the invention is to provide an axial turbomachine of this type.

The object directed at the ring diffuser initially mentioned is achieved by means of a ring diffuser having the features of the claims.

The invention is based on the recognition that, in ring diffusers of the type initially mentioned, the unevenness of the inflow in the circumferential direction has not hitherto been taken into account. It is therefore not possible for the diffuser to operate in the best possible way, since either the potential of the boundary layer in terms of breakaway-free deceleration in the regions of higher total pressure cannot be fully implemented or else the load is too high in regions of lower total pressure and consequently an extremely high-loss flow breakaway may occur.

Moreover, the invention is based on the recognition that the unevenness of the flow in the circumferential direction cannot be reduced or even avoided arbitrarily, since it results from the obviously necessary deflection of the upstream guide vane cascade. Instead, the invention is based on the idea of taking into account the unevenness of the inflowing air in the circumferential direction and of adapting the ring diffuser to that effect. For this purpose, it is proposed that the ring diffuser have on the inflow side a non-rotationally symmetrical shape which is followed downstream, with respect to the throughflow direction of the ring diffuser, by a rotationally symmetrical portion. In other words, the envelope-shaped wall surface of the inner wall and/or the envelope-shaped wall surface of the outer wall of the ring diffuser are/is of non-rotationally symmetrical design on the inflow side. It is thus possible to have a better cross-sectional profile which converts the kinetic flow energy actually present in any position on the circumference into static pressure in the best possible way. Thus, the distribution of the flow magnitudes is already exactly taken into account at the inlet into the ring diffuser along the circumference of the ring-shaped diffuser duct, although this has been ignored hitherto. Particularly as a result of this, it is possible to adapt the deceleration to the distribution, present in the inlet, of the kinetic energy and, consequently, to recover maximum overall pressure.

According to a further feature of the invention, the rotational asymmetry has a critical axial contour which forms with the axial extent an angle $\alpha$, the size of which amounts to between 0° and 40°. The critical contour may be, for example, the axial profile of the maximum point of one of the elevations or of the minimum point of one of the depressions. The angle $\alpha$ may in this case be of different size in different axial positions on the portion, so that, as seen in the axial direction of the diffuser, a curved contour of the rotational asymmetry is obtained. Preferably, the angle is greatest at the inflow-side end of the ring diffuser and decreases evenly or unevenly in the flow direction.

In the context of this publication, an enveloping surface of a body is rotationally symmetrical when it is mapped, rotated through any angle about a central axis (axis of symmetry), onto itself. If this requirement is not given, the enveloping surface is rotationally asymmetrical. In this case, however, that part of an enveloping surface of a body should be ignored which is rotationally asymmetrical solely for reasons of the fastening of a body to a carrying structure and/or for reasons of the assembly of the, if appropriate, multipart body into a tubular body. If, for example, screw orifices for fastening screws are distributed in the enveloping surface along the circumference, these screw orifices are not taken into account, in the context of this publication, for the purpose of checking whether the enveloping surface is rotationally symmetrical or not. In this respect, what is relevant for rotational asymmetry is only that radially outer and/or radially inner wall surface (enveloping surface) which is suitable for influencing the radially outermost or radially innermost flow in the context of the invention. Even struts possibly present, distributed along the circumference between the inner diffuser wall and the outer diffuser wall, are ignored in checking whether the respective enveloping surface is rotationally asymmetrical.

The object directed at the arrangement for an axial turbine is achieved by means of an arrangement according to the features of the claims. The abovementioned unevenness of the working medium flowing in to a diffuser duct is comparatively high when a guide vane cascade through which the working medium is capable of flowing is provided in a flow duct preceding the diffuser duct between the wall surfaces of an outer wall and of an inner wall. To that extent, for an arrangement comprising the outlet of a diffuser and a ring diffuser following this, it is especially expedient to provide a rotationally asymmetrical wall surface according to the invention, since the flow unevennesses initially mentioned may occur especially there. This is true all the more so when free-standing guide vanes form a guide vane cascade directly upstream of the compressor outlet.

The object directed at the axial turbomachine is achieved by means of the features of the claims, the advantages applicable to the arrangement being afforded similarly in the axial turbomachine.

Advantageous refinements are specified in the subclaims.

According to a first advantageous development, the respective rotationally asymmetrical radially inner and/or radially outer wall surface has elevations and depressions alternately along the circumference. In other words: the rotationally asymmetrical wall surface is wavy in the circumferential direction, the elevations being designed as wave crests and depressions as wave troughs. The contour, that is to say the transitions between the elevations and depressions, may in this case be of any desired form. Insofar as the cross section of the rotationally asymmetrical wall surface is illustrated as a developed view, the contour could, for example, be sawtooth-like, triangular or even sinusoidal, if appropriate with rectilinear (ramp-shaped) or even planar portions lying in each case in between. The abovementioned contours may also be combined with or superposed on one another in any desired way. Overall, however, the contour is selected such that it evens the non-rotationally symmetrical flow in the best possible way, in order to achieve a substantially improved conversion of the flow energy of the medium into total pressure.

According to a further advantageous refinement of the invention a duct height is present on the inflow side, as seen in the radial direction, between the wall surface of the inner wall and the wall surface of the outer wall, the maximum height or maximum depth amounting at most to 25% of the duct height. Disturbance of the medium flowing centrally between the inner wall and the outer wall can thereby be avoided. At the same time, a significant evening of the flow which is uneven on the inflow side can be achieved.

Depending on the type of unevenness of the flow along the circumference of the diffuser duct, the elevations may have different heights and/or the depressions may have different depths in different axial positions on the portion. In other words: the axial portion, the wall surface of which is rotationally asymmetrical, has an inflow-side portion end and an outflow-side portion end, the rotational asymmetry being greatest at the inflow-side portion end and decreasing toward the outflow-side portion end, since the unevenness of the flow can be reduced constantly in the flow direction by means of the rotational asymmetry. Expediently, the rotational asymmetry terminates at the outflow-side portion end and at the same time merges continuously, that is to say steplessly, into a rotationally symmetrical portion of the ring diffuser.

Alternatively or additionally to the abovementioned, it is possible that the elevations have different heights and/or the depressions have different depths in one axial position on the portion. This refinement is advantageous when a flow magnitude to be evened out has a plurality of local maxima or minima of different size along the circumference.

It proved advantageous that the ring diffuser or at least the asymmetrical portion is designed as an axial diffuser or as a diagonal diffuser.

Since rotational asymmetries occur in the flow medium particularly when the ring diffuser is preceded by a guide vane cascade, the use of a ring diffuser according to the invention is especially advantageous in such an arrangement. This arrangement then comprises a ring-shaped flow duct between an outer wall and an inner wall to which a guide vane cascade through which a working medium is capable of flowing is provided. The guide vane cascade may in this case be designed as a guide vane cascade of a vane stage or as a follow-up guide wheel. It is, of course, possible that the arrangement has both a guide vane cascade as part of a vane stage and one or more guide vane cascades as follow-up guide wheels. Since the asymmetry in the working medium occurs particularly in the case of guide vane cascades having freestanding vane leaves, it makes particular sense to use the ring diffuser according to the invention downstream of a guide vane cascade of this type, in particular that wall surface of the ring diffuser on which the gaps are arranged further upstream then being of rotationally asymmetrical design: if the vane leaves of the guide vane cascade are fastened radially on the outside to a guide vane carrier, such that their inwardly directed vane leaf tips lie opposite the inner wall of the flow duct so as to form a gap, then at least the wall surface of the inner wall of the ring diffuser is partially of rotationally asymmetrical design. In the event that the free-standing guide vanes of the guide vane cascade lie opposite the outer wall of the flow duct so as to form a gap, then at least the wall surface of the outer wall of the ring diffuser is of rotationally asymmetrical design.

In order to provide an especially aerodynamically low-loss transition between the wall surface of the outer wall of the ring diffuser and the wall surface of the outer wall of the flow duct and/or the wall surface of the inner wall of the ring diffuser and the wall surface of the inner wall of the flow duct, the transition is designed to be stepless.

Depending on the configuration of the arrangement and of the flow which occurs, it may be necessary for the wall surface of the outer wall of the flow duct and/or the wall surface of the inner wall of the flow duct, in which the guide vane cascade is arranged, also to be of at least partially rotationally asymmetrical design.

Overall, the invention is expedient for devices which comprise as the arrangement at least one compressor outlet and one ring diffuser. Particularly in the case of devices of this type, unevennesses in the inflow occur in the medium, as seen along the circumference of the flow duct, and can be taken into account by means of a configuration according to the invention. By the local inflow conditions being taken into account, the load in regions of lower total pressure can be reduced. At the same time, the potential of the boundary layer in terms of breakaway-free deceleration in regions of higher total pressure can be implemented more effectively, so that, overall, fewer breakaways occur, even if they cannot be avoided completely. In general, therefore, lower aerodynamic losses occur even in the guide vane cascade and also in the ring diffuser, so that higher pressure recovery than in the case of a rotationally symmetrical ring diffuser is possible. Consequently, by means of the devices according to the invention, the kinetic energy actually present in any position on the circumference is converted into static pressure in the best possible way.

BRIEF DESCRIPTION OF THE DRAWINGS

The invention is explained in more detail by means of a drawing, further features and advantages being explained in the following description of the figures. In the drawing:

FIG. 3 shows a top view of part of a developed view of the wall surface of the inner wall of the diffuser and of the flow duct of the compressor, FIG. 4 shows section IV-IV according to FIG. 3, and FIG. 5 shows a cross section through the inner wall of the ring diffuser.

DETAILED DESCRIPTION OF INVENTION

Figure 1:
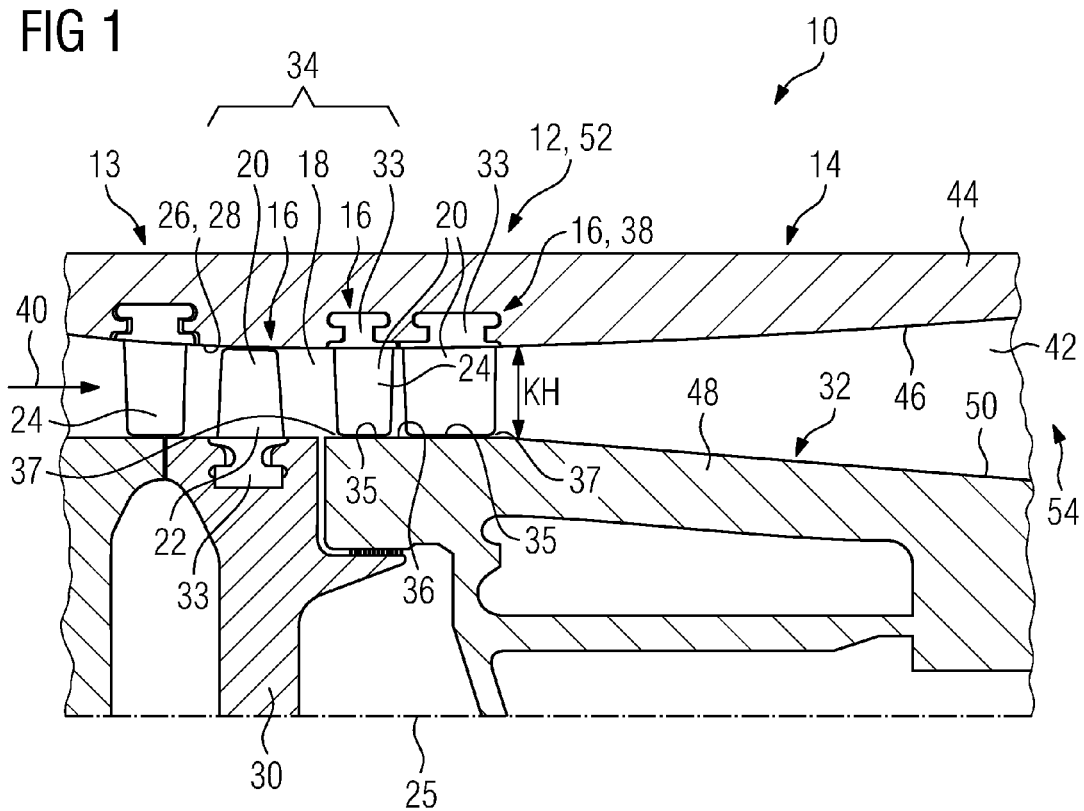
FIG. 1 shows the longitudinal section through the compressor outlet of an axial compressor and the ring diffuser, following it, of a stationary axial-throughflow gas turbine.

FIG. 1 shows a longitudinal section through an axial-throughflow stationary gas turbine 10 in the portion of an outlet 12 of the gas turbine compressor 13 and the ring diffuser 14 following the outlet 12. Of the compressor 13, only the vane cascades 16 arranged in the downstream, that is to say rear part of the compressor 13 are illustrated. Each vane cascade 16 comprises at least the vane leaves 20 arranged in a radiating manner in a flow duct 18 of ring-shaped cross section, each vane leaf 20 being either an integral part of a moving vane 22 or an integral part of a guide vane 24.

25 designates the machine axis about which the flow duct 18 of ring-shaped cross section extends concentrically. The flow duct 18 of the compressor 13 is delimited on the outside by a wall surface 26 which is part of a guide vane carrier 28. The radially inner boundary of the flow duct 18 is formed essentially by rotor disks 30 and, downstream thereof, by a fixed shaft cover 32. The moving vanes 22 are fastened to the rotor disk 30 by means of, for example, hammerhead-shaped hooking 33. Their free-standing vane leaf tips lie opposite the wall surface 26 so as to form a gap. Downstream of the moving vanes 22, the guide vanes 24 belonging to a vane cascade 16 are likewise fastened to the guide vane carrier 28 via hooking 33. In this case, the moving vanes 22 fastened to the rotor disk 30 form, together with the guide vanes 24 arranged downstream thereof, the last compressor stage 34 of the axial compressor 13. The guide vanes 24 of the last compressor stage 34 are likewise designed as free-standing vanes, so that their respective free vane leaf tip 35 in each case lies opposite a wall surface 36 so as to form a gap 37, said wall surface 36 being part of the shaft cover 32.

Further downstream of the guide vane cascade 16 of the last compressor stage 34, a further vane cascade 16, as what is known as a follow-up guide wheel 38, is provided, which is likewise fastened rigidly radially on the outside to the guide vane carrier 28 via hooking 33. The vane leaves 20 of the follow-up guide wheel 38 also lie opposite the wall surface 36 of the shaft cover 32 so as to form a gap 37.

The follow-up guide wheel 38 is followed by a ring diffuser 14, as seen in the flow direction of the medium 40 compressed by the vane leaves 20. The ring diffuser 14 has a likewise ring-shaped diffuser duct 42 which is delimited radially on the outside by an outer wall 44 of circular cross section. More precisely, the wall surface 46, of essentially circular cross section, of the outer wall 44 delimits the diffuser duct 42 radially on the outside. The outer wall of the flow duct 18 and the outer wall 44 of the diffuser duct 42 are in this case formed by the same structure, to be precise by the guide vane carrier 28, although this does not necessarily have to be so. The ring diffuser 14 comprises, furthermore, an inner wall 48 which is coaxial to the outer wall 44 and is part of the shaft cover 32. In this case, the wall surface 50 of the inner wall 48 of circular cross section delimits the diffuser duct 42 radially on the inside. The walls 44, 48 or their wall surfaces 46, 50 diverge along the longitudinal extent of the ring diffuser 14 from an inflow-side end 52 of the ring diffuser 14 to an outflow-side end 54. The distance, seen in the radial direction and acquired in the inflow region of the ring diffuser 14, between the outer wall surface 46 and the inner wall surface 50 is designated as the duct height KH.

By free-standing guide vanes 24 being used in the last compressor stage 34 and/or in the follow-up guide wheel 38, a velocity distribution or total pressure distribution which is uneven along the circumference occurs at the outlet of the follow-up guide wheel 38 in a compressed medium 40 when the gas turbine 10 is in operation and hence when the compressor 13 is in operation. This is caused, in particular, by the influence of a gap eddy flow which is itself brought about by the gap 37 between the guide vane leaf tips 35 and the wall surface 36 lying opposite these. The compressor outlet flow 40 arriving at the compressor outlet 12 or flowing into the ring diffuser inlet is therefore rotationally asymmetrical. It has flow velocities differing in size and flow directions along the circumference, particularly in near-wall regions.

According to the invention, a non-rotationally symmetrical wall surface 50 follows downstream of that wall surface 36 opposite which the guide vane leaf tip 35 lies so as to form a gap 37 in the wall surface 36. The wall surface 50 is part of the ring diffuser 14 and extends over at least one axial portion. The rotationally asymmetrical contour of the wall surface 50 in the region of the ring diffuser 14 is not illustrated in any more detail in FIG. 1.

Figure 2:
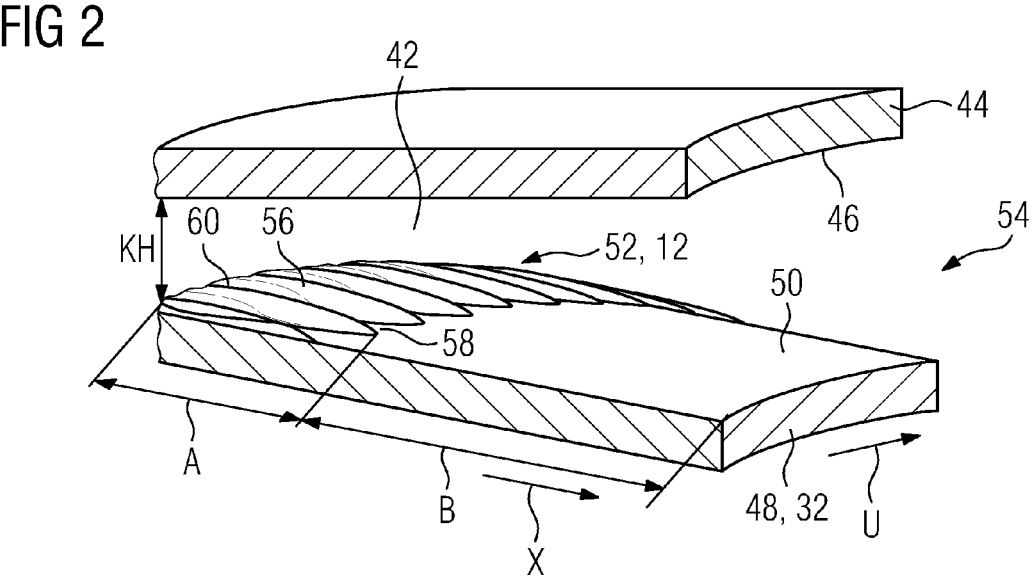
FIG. 2 shows a perspective illustration of a sector-shaped detail from the ring diffuser according to FIG. 1.

FIG. 2 shows a perspective illustration of a detail from the diverging diffuser duct 42 according to the invention of the ring diffuser 14. Diverging in this case means that the cross-sectional area through which the medium is to flow increases in the downstream direction. In the case of axial diffusers, the increase may take place, for example, due to the reduction in the average diameter of the inner wall 48 and/or due to the increase in the average diameter of the outer wall 44. In the case of diagonal diffusers, both the diameter of the outer wall and the diameter of the inner wall are increased, the increase in size of the diameter of the outer wall being greater than that of the inner wall.

FIG. 2 in this case illustrates only the walls 44, 48 delimiting the diffuser duct 42. The inflow-side end 52, coinciding with the compressor outlet 12, of the ring diffuser 14 is illustrated further to the left in FIG. 2. The compressor diffuser outlet, that is to say the outflow-side end 54 of the ring diffuser 14, is shown further to the right in FIG. 2. A portion A, in which the wall surface 50 is of rotationally asymmetrical design, extends in the axial direction X from the inflow-side end 52 of the ring diffuser 14. The rotational asymmetry shown arises due to the arrangements of elevations 56 and depressions 58 arranged alternately along the circumference U of the wall surface 50. A rotationally symmetrical portion B, which extends as far as the diffuser outlet, follows downstream of the portion A.

The elevations 56 and depressions 58 are distributed evenly along the circumference U in a number corresponding to the number of guide vanes 24 of the follow-up guide wheel 38. In the configuration shown in FIG. 2, the axial extent of the portion A amounts to about 30% of the overall axial extent of the ring diffuser 14. It is also possible, however, that the portion A extends over the entire length of the ring diffuser 14, that is to say over 100%.

Each elevation 56 has a line 60 which likewise extends in the flow direction and marks the maximum height of the corresponding elevation. This line 60 constitutes a critical contour which forms with the axial direction X an angle α. This angle α may have a size of up to 40°, depending on the unevenness of the oncoming flow, while the angle α may also be of different size in different axial positions. The line 60 would then correspondingly not be rectilinear, but, instead, curved, as seen in the axial direction. This is illustrated by way of example by the lines 60 shown in FIG. 3. FIG. 3 shows a top view of a developed view of the inner wall 48, at the same time with a section through the guide vanes 24. The vane leaves 20 illustrated further up in FIG. 3 are those of the guide vanes 24 of the last compressor stage 34, the vane leaves 20 of the guide vanes 24 of the follow-up guide wheel 38 being shown downstream thereof.

The elevations 56 and depressions 58 lead to a deflection of the flow of the medium 40 occurring radially on the inside in the diffuser duct 42, with the result that a continuous local adaptation of the flow zones having different flow conditions, to the flow zones arranged between them and having mainly identical flow conditions takes place. Adaptation leads, overall, to an evening of the flow properties of the flow arriving at the ring diffuser inlet 52, so that the flow running counter to pressure in the ring diffuser 14 can be decelerated more evenly and therefore with lower loss. Efficient conversion of kinetic flow energy into static pressure is thereby achieved, without an extremely high-loss flow breakaway occurring.

It can be gathered from FIG. 2 that the elevations 56 and depressions 58 have different heights or depths in the flow direction. The span between height and depth is maximum on the inflow side. With an increasing axial length, the heights and depths of adjacent elevations 56 and depressions 58 approach one another, until they are combined at the downstream-side end of the portion A on a common radius. The ring diffuser then extends rotationally symmetrically from this position toward the outflow-side end 54 (FIG. 2).

According to FIG. 2, all the elevations 56 and depressions 58 terminate in one axial position. By contrast, it is also conceivable that different elevations 56 and depressions 58 terminate in different axial positions. For example, for the diffuser inlet side, elevations 56 and depressions 58 may be present in a number identical to that of the guide vanes 24, whereas the number of elevations 56 and depressions 58 then decreases toward the diffuser outlet 54. This is advantageous, for example, when the diffuser flow is to be adapted to structures arranged downstream of the ring diffuser 14. The structures could be, for example, struts or supports which are distributed along the circumference in a smaller number than guide vanes 24 and, for example, connect the shaft cover 32 to the casing. However, the structures could also be the burners or tubular combustion chambers of the gas turbine.

It can be gathered from FIG. 3 that the rotationally asymmetrical portion A of the ring diffuser 14 may not only be provided in the diffuser duct 42. The rotationally asymmetrical portion A may, if appropriate, also extend further upstream into the flow duct 18 of the compressor 13, insofar as this is necessary. In this case, the deflection of the flow then takes place there by means of the vane leaves 20, this applying particularly to the more central medium flow remote from the wall. The near-wall flow, in particular that near-wall flow on which wall 48 the radial gaps 37 of the vane leaves 20 are arranged, can then even be influenced already by the elevations 56 and depressions 58 and, if appropriate, deflected.

FIG. 4 shows a detail through the cross section of the flow duct 18 with the vane leaves 20 arranged therein. The vane leaves 20 are fastened radially on the outside, although this is not shown in FIG. 4. By contrast, FIG. 4 shows the free-standing vane leaf tips 35 which lie opposite the inner wall 48 to form a gap. The radial gaps are designated by 37. According to FIG. 4, the wall surface 50 of the inner wall 48 is also of rotationally asymmetrical design, the elevations 56 and depressions 58 occurring in the same number as the guide vanes 24. The contour 62, as seen in cross section, of the elevations 56 and depressions 58 in this case equates to a form with periodically recurring sawteeth having curved ramps.

An alternative form of the cross-sectional contour 62 of the elevations 56 and depressions 58 which may be used, for example, further downstream in the diffuser duct 42, is shown in FIG. 5. Here, the contour is approximated basically to a sine form, one of the two flanks 66, which in each case connects one of the elevations 56 to an adjacent depression 58, is in each case designed to be steeper than the other of the two flanks 68. However, this form of the contour 62 is not restrictive, but merely illustrative. Other contours, even contours provided with angular tips, may be envisaged.

Moreover, FIG. 5 illustrates the mean radius $r_m$, in relation to the machine axis 25, onto which a maximum height H of the elevation 56 and a maximum depth T of the depression 58 are related. The definition of the mean radius $r_m$ is in this case the arithmetic mean of that radius on which the maximum height H is arranged and that radius on which the maximum depth T is arranged. The maximum height H or maximum depth T in this case amounts to at most 25% of the inflow-side duct height KH.

Overall, the invention relates to a ring diffuser 14 for an axial turbomachine, for example for a gas turbine 10, with an outer wall 44 and an inner wall 48 coaxial thereto, between which a diffuser duct 42 extends in ring form along an axial extent so as to diverge from an inflow-side end 52 to an outflow-side end 54, the inner wall 48 and the outer wall 44 in each case comprising a wall surface 46, 50 delimiting the diffuser duct 42. In order to specify a diffuser duct 42 which is adapted to an inflow uneven along the circumference and by means of which a specially efficient conversion of kinetic energy into static energy is possible, the invention proposes a wall surface 44, 46 which delimits the diffuser duct 42 on the inlet side and which is rotationally asymmetrical.

The invention claimed is:

1. A ring diffuser for an axial turbomachine, comprising:
   an outer wall;
   an inner wall coaxial with the outer wall; and
   a diffuser duct between the outer wall and the inner wall extending in ring form along an axial extent so as to diverge from an inflow-side end to an outflow-side end,
   wherein the inner wall and the outer wall in each case comprise a wall surface delimiting the diffuser duct, a first wall surface of the inner wall and/or a second wall surface of the outer wall being rotationally asymmetrical at least in a first portion of the ring diffuser,
   wherein the first portion is arranged at the inflow-side end of the ring diffuser and merges into a rotationally symmetrical second portion which is arranged downstream of the rotationally asymmetrical first portion in relation to a throughflow direction of the ring diffuser, and
   wherein the rotational asymmetry of the first portion includes a critical axial contour which forms with the axial extent an angle, the size of which amounts to between 0° and 40° and is of different size in different axial positions of the first portion.

2. The ring diffuser as claimed in claim 1, wherein the rotationally asymmetrical wall surface includes elevations and depressions along a circumference of the asymmetrical wall surface.

3. The ring diffuser as claimed in claim 2, wherein between the first wall surface and the second wall surface, there is an inflow-side duct height to which a maximum height of each elevation and a maximum depth of each depression are related, the maximum height or the maximum depth amounting at most to 25% of the duct height.

4. The ring diffuser as claimed in claim 2, wherein the elevations have different heights and/or the depressions have different depths in one axial position in the first portion.

5. The ring diffuser as claimed in claim 2, wherein the elevations have different heights and/or the depressions different depths in different axial positions in the first portion.

6. The ring diffuser as claimed in claim 1, wherein the first portion, the wall surface of which is rotationally asymmetrical, merges continuously into the rotationally symmetrical second portion.

7. The ring diffuser as claimed in claim 1, wherein at least the first portion is designed as an axial diffuser or diagonal diffuser.

8. An arrangement for an axial turbomachine, comprising:
   a ring-shaped flow duct which is delimited by wall surfaces of an outer wall and of an inner wall, respectfully,
   wherein between the outer wall and the inner wall is provided a guide vane cascade through which a medium is capable of flowing, and
   wherein a ring diffuser is arranged downstream of the guide vane cascade, the ring diffuser as claimed in claim 1.

9. The arrangement as claimed in claim 8, wherein the guide vane cascade is designed as a guide vane cascade of a vane stage or as a follow-up guide wheel.

10. The arrangement as claimed in claim 8,
    wherein the guide vane cascade comprises a plurality of aerodynamically curved vane leaves,
    wherein free-standing vane leaf tips of the plurality of curved vane leaves lie, radially on the inside, opposite the inner wall of the flow duct so as to form a gap.

11. The arrangement as claimed in claim 8,
    wherein the guide vane cascade comprises a plurality of aerodynamically curved vane leaves,
    wherein free-standing vane leaf tips of the plurality of curved vane leaves lie, radially on the outside, opposite the outer wall of the flow duct, so as to form a gap.

12. The arrangement as claimed in claim 10,
    wherein a further outer wall of the ring diffuser is arranged downstream of the outer wall of the flow duct and/or a further inner wall of the ring diffuser is arranged downstream of the inner wall of the flow duct, and
    wherein the wall surface of the ring diffuser at which the gaps are arranged further upstream is a rotationally asymmetrical design.

13. The arrangement as claimed in claim 11,
    wherein a further outer wall of the ring diffuser is arranged downstream of the outer wall of the flow duct and/or a further inner wall of the ring diffuser is arranged downstream of the inner wall of the flow duct, and
    wherein the wall surface of the ring diffuser at which the gaps are arranged further upstream is a rotationally asymmetrical design.

14. The arrangement as claimed in claim 8, wherein the wall surface of the outer wall of the ring diffuser merges into the wall surface of the outer wall of the flow duct and/or the wall surface of the inner wall of the ring diffuser merges into the wall surface of the inner wall of the flow duct.

15. The arrangement as claimed in claim 8, wherein the wall surface of the outer wall of the flow duct and/or the wall surface of the inner wall of the flow duct have/has in each case a portion in which one wall surface or both wall surfaces is or are rotationally asymmetrical.

* * * * *